United States Patent [19]

Weissenberger et al.

[11] Patent Number: 4,854,438

[45] Date of Patent: Aug. 8, 1989

[54] CLUTCH DISC FOR A FRICTION DISC CLUTCH

[75] Inventors: Helmuth Weissenberger, Waigolshausen; Peter Huditz, Ingolstadt, both of Fed. Rep. of Germany

[73] Assignee: Fichtel & Sachs AG, Schweinfurt, Fed. Rep. of Germany

[21] Appl. No.: 193,408

[22] Filed: May 12, 1988

[30] Foreign Application Priority Data

May 29, 1987 [DE] Fed. Rep. of Germany ....... 3718147

[51] Int. Cl.$^4$ .............................................. F16D 13/68
[52] U.S. Cl. .......................... 192/107 R; 192/107 M; 411/34; 411/43; 411/901; 411/908
[58] Field of Search ...................... 192/107 M, 107 R; 411/34, 43, 45, 501, 504, 505, 506, 901, 908

[56] References Cited

U.S. PATENT DOCUMENTS

| | | |
|---|---|---|
| 2,630,199 | 3/1953 | Gamble . |
| 2,834,998 | 5/1958 | Wilder ................................. 411/901 |
| 4,168,650 | 9/1979 | Dahl et al. ............................ 411/43 |
| 4,687,394 | 8/1987 | Berecz ................................. 411/901 |
| 4,718,801 | 1/1988 | Berecz ................................. 411/908 |

FOREIGN PATENT DOCUMENTS

| | | |
|---|---|---|
| 1959958 | 11/1969 | Fed. Rep. of Germany ........ 411/43 |
| 3431185 | 8/1984 | Fed. Rep. of Germany . |
| 326147 | 3/1930 | United Kingdom . |
| 607828 | 9/1948 | United Kingdom . |
| 768510 | 2/1957 | United Kingdom .......... 192/107 M |
| 854471 | 11/1960 | United Kingdom . |
| 2006907 | 5/1979 | United Kingdom . |
| 2103311 | 2/1983 | United Kingdom .......... 192/107 M |
| 2103733 | 2/1983 | United Kingdom ............ 192/107 R |

Primary Examiner—Leslie A. Braun
Assistant Examiner—Andrea Pitts
Attorney, Agent, or Firm—Toren, McGeady & Associates

[57] ABSTRACT

The clutch disc for a friction disc clutch comprises friction linings attached to a lining carrier by connection elements. The connection elements are provided with a synthetic plastics conical head, seated in a conical opening of the friction lining. A shank, on the side of the lining carrier turned away from the friction lining, has been deformed into a closing head. The portion of the shank forming the closing head can consist of synthetic plastics, too, or can be formed by a metal hollow rivet anchored in the head. The synthetic plastics head wears out along with, and increases, the wearable volume of the friction lining.

8 Claims, 2 Drawing Sheets

CLUTCH DISC FOR A FRICTION DISC CLUTCH

BACKGROUND OF THE INVENTION

The invention relates to a clutch disc for a friction disc clutch.

Conventional clutch discs of motor vehicle friction disc clutches have a hub on which a lining carrier of disc form is held, possibly through a torsional vibration damper. Friction linings are riveted on both sides on the lining carrier with metal rivets. The rivets are seated in apertures of blind hole form of the friction linings and limit the thickness of the friction linings which can be worn away, to a comparatively small proportion of the total thickness of the friction linings.

It is known from U.S. Pat. No. 2,630,199 to stick a metal back on the friction linings and to form the fastening rivets integrally out of the metal back. While in this way the wearable volume of the friction linings can be increased, this advantage is, however, gained at the cost of a greater inertia moment of the clutch disc and an increased constructional expense.

It is known from DE-A-34 31 185 to form rivet pins on the friction linings and to deform the rivet pins into a rivet head on the side of the lining carrier remote from the friction lining. The wearable volume of the friction linings can be increased by this configuration, too. Here again this advantage is obtained at the cost of an increase of the production expense in the one-piece forming of the rivet pins, consisting of the material of the friction linings, on the friction linings.

The invention is directed towards provision of a clutch disc for a friction disc clutch, especially of a motor vehicle, in which the expense for the production and fitting of the friction lining is comparatively low and the friction linings can be worn away over a comparatively large part of their thickness, that is they have a comparatively great wearing volume.

SUMMARY OF THE INVENTION

In accordance with the invention, connection elements are used which are anchored with a synthetic plastic material head in an opening of the friction lining which is to be secured on the lining carrier. The connection elements have a shank passing through a hole in the lining carrier, which the shank is anchored on the side of the lining carrier remote from the friction lining. The synthetic plastic material head widens conically away from the lining carrier and is seated in a matching conical opening of the friction lining.

The friction lining openings can be produced at favourable cost, for example by swaging, and centre the friction lining on the conical head of the connection element, which is centered by means of its shank in the lining carrier. The synthetic plastics material head engages at least partially in the wearing volume of the friction lining and wears away therewith. Compared with conventional clutch discs, it is possible to increase the wearing volume, assuming equal friction lining thicknesses. Assuming equal wearing volumes, it is possible to use thinner friction linings, whereby the inertia moment of the clutch disc can be reduced. Connection elements in accordance with the invention can be used for clutch discs both with and without lining springing. The clutch disc is especially suitable for use in commercial vehicles, for example freight vehicles. Furthermore, the configuration of the connection elements, in accordance with the invention, largely avoids the tearing out of the bottoms of the openings which occurs on overloading in conventional clutch discs.

In a first embodiment, the shank of the connection element likewise consists of synthetic plastics material. For anchorage on the lining carrier, the shank is plastically deformed, preferably by heating and subsequent upsetting.

In a variant, in which again the entire connection element consists of synthetic plastics material, the shank is formed as a hollow shank and slitted a number of times in the longitudinal direction for the formation of radially resilient snap tongues. In this configuration, the friction linings can be fitted especially simply on the lining carrier.

Developments in which the shank comprises a hollow rivet, consisting of metal and anchored in the synthetic plastics material head, are also advantageous. The hollow rivet is crimped over outwards or upset on the back of the lining carrier, for the securing of the friction lining on the back of the lining carrier. The hollow rivet of the shank increases the shearing strength and extraction load capacity of the connection element.

In a further preferred embodiment, the hollow rivet encloses a synthetic plastics material core formed integrally on the synthetic plastics material head. The synthetic plastics material core fills out the interior of the hollow rivet and increases the load capacity of the connection element. Furthermore, the synthetic plastics material core can be provided at its end remote from the synthetic plastics material head with a tool-introduction taper and guide the rivetting or upsetting tool in the assembly operation. The closing of the hollow rivet, by upsetting a closure head, has in this connection the advantage that the tapered synthetic plastics material head is drawn fast into the tapered opening of the friction lining.

The hollow rivet is anchored in the region of the smallest diameter of the synthetic plastics material head with an annular collar embedded in the synthetic plastics material of the synthetic plastics material head. The annular collar can protrude radially outwards in the case of hollow rivets at least partially jacketed with synthetic plastics material. The external diameter of the annular collar is expediently greater than the external diameter of the shank, and thus greater than the diameter of the hole in the lining carrier. Connection elements of this configuration have increased shearing strength and can be subjected to comparatively high tension stress. Alternatively, an annular collar can protrude both inwards and outwards, the outer annular collar having a tapered form and being a component of the tapered surface of the head. The taper of the annular collar increases the tension strength of the connection, since the hollow rivets partially directly take up the tension forces.

The tapered opening of the friction lining, which takes up the tapered synthetic plastics material head, merges on the side of the lining carrier into a cylindrical opening region, the diameter of which is equal to the diameter of the hole of the lining carrier. The cylindrical opening region in a simple manner permits the compensation of diameter tolerances of the friction lining opening.

The various features of novelty which characterize the invention are pointed out with particularity in the claims annexed to, and forming a part of, this disclosure. For a better understanding of the invention, its operat-

DESCRIPTION OF PREFERRED EMBODIMENTS

Figure 1:
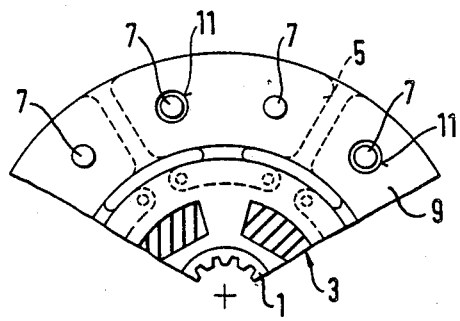
FIG. 1 shows a partial axial view of a clutch disc of a motor vehicle friction disc clutch.

FIG. 1 shows a clutch disc of a motor vehicle friction clutch having a hub 1 on which a lining carrier 5 of disc form is guided through a conventional torsional vibration damper 3. Friction linings 9, arranged on both sides of the lining carrier 5, are secured on the lining carrier 5 with connection elements 7. Each of the connection elements 7 anchors only one of the two friction linings 9 on the lining carrier 5, and for this purpose the elements 7 are seated in apertures 11 of the other friction lining in each case. The lining carrier 5 can be made without lining springing, but it can also include a lining springing system, in which case the connection elements secure the friction linings each independently on the lining springs.

Figure 2:
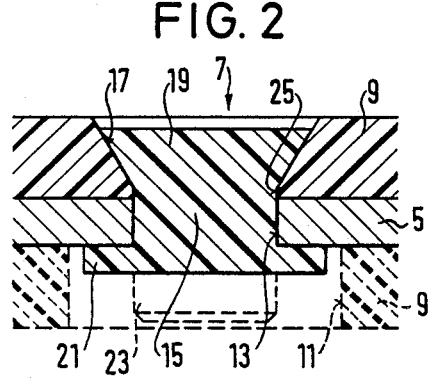
FIG. 2 shows a sectional view of a connection element used according to the invention for the securing of friction linings of the clutch disc according to FIG. 1.

FIG. 2 shows details of the connection element 7. It consists in one piece of synthetic plastics material and has a shank 15 seated in a hole 13 of the lining carrier 5, which shank widens, in a tapered opening 17 of the friction lining 9 into a tapered synthetic plastics material head 19. On the side remote from the synthetic plastics material head, the shank 15 is plastically deformed into a closure head 21. The original configuration of the shank 15 is indicated in chain lines at 23. From this original configuration, the shank 15 is reshaped, by heating and upsetting by means of an upsetting tool, into the closure head 21 engaging behind the edge of the hole 13. For the compensation of diameter tolerances, the tapered opening 17 merges into a cylindrical section 25 in the region of its smallest diameter.

The connection element 7 can be fitted simply and ensures a high wearing volume of the friction lining 9 secured to the lining carrier 5, since the synthetic plastics material head 19 can wear together with the friction lining 9. By reason of the tapered form of the synthetic plastics material head 19 and of the opening 17, the friction lining can be very extensively worn away without fear of tearing out of the opening 17. The opening 17 can be worked in very simply, for example by pressing into the friction lining 9.

Variants of the connection element will be described below. Parts of like effect are designated with the reference numerals of FIGS. 1 and 2, and provided with a letter for distinction. For explanation, reference is made to the description of FIGS. 1 and 2.

Figure 3:
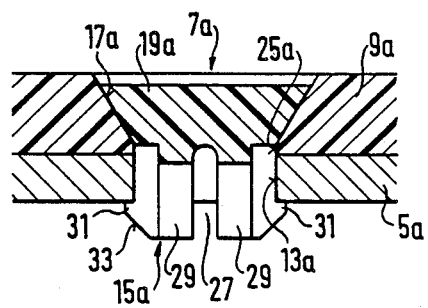
FIG. 3 shows another embodiment of a connection element.
Figure 4:
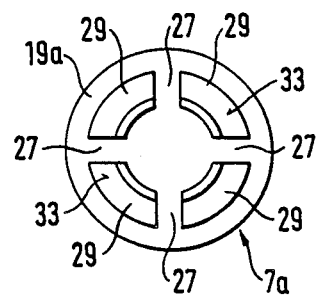
FIG. 4 shows an end view of the connection element according to FIG. 3.

FIGS. 3 and 4 show a connection element 7a for the snap fastening of a friction lining 9a to a lining carrier 5a. The connection element 7a consists again entirely of synthetic plastics material and has a tapered synthetic plastics material head 19a, which is seated in a tapered opening 17a of the friction lining 9a. In the region of its minimum diameter, the tapered opening 17a merges into a cylindrical opening 25a. The synthetic plastics material head 19a shows a hollow shank 15a engaging through the hole 13a of the lining carrier 5a, which shank is divided by several, here four, axially extending slots 27 into radially resilient detent tongues 29. The detent tongues 29 carry, on their ends remote from the synthetic plastics material head 19a, detent projections 31 which taper towards the free end by way of an introduction taper 33. The axial distance of the detent projections 31 from the base of the synthetic plastics material head 19a is adapted to the thickness of the lining carrier 5a. For fastening, the connection element 7a is pressed with the detent tongues 29 leading into the opening 17a, the detent tongues 29 being deflected radially inwards until their detent projections 31 snap in behind the lining carrier 5a. The synthetic plastics material head 19a here again ensures an increase of the wearing volume of the friction lining 9a.

Figure 5:
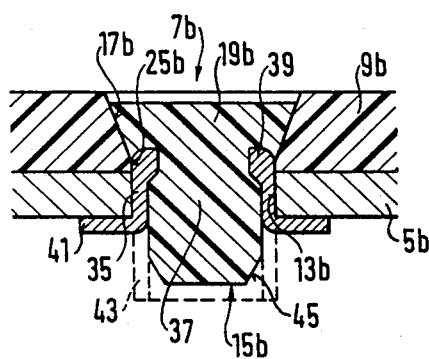
FIGS. 5 to 9 show sections of further connection elements.

The connection element 7b, as represented in FIG. 5, again has a tapered synthetic plastics material head 19b, seated in a tapered opening 17b of the friction lining 9b, in order to increase the wearing volume of the friction lining 9b. The opening 17b again merges in the region of its minimum diameter into a cylindrical section 25b. In distinction from the connection elements, according to FIGS. 2 and 3, however, the shank 15b which penetrates the hole 13b of the lining carrier 5b includes a metallic hollow rivet 35, which is filled out by a synthetic plastics material core 37 integrally connected with the synthetic plastics material head 19b. The hollow rivet 35 ends in the region of the smallest diameter of the synthetic plastics material head 19b, and is here provided with a radially inwardly protruding annular collar 39, for anchorage in the synthetic plastics material head. The annular collar is expediently attached by upsetting, but can also be produced by crimping over. The hollow rivet 35 is crimped over radially outwards for the formation of a closing head 41. 43 indicates the original form of the hollow rivet 35, in which it overlaps an introduction ramp formed on the end of the synthetic plastics material core 37 remote from the head. The introduction ramp 45 facilitates the introduction of the crimping tool which is centered on the synthetic plastics material core 37 during the crimping operation. The connection element 7b increases the wearing volume of the friction lining 9b, while the hollow rivet fastening ensures increased tension load capacity and shearing strength.

Figure 6:
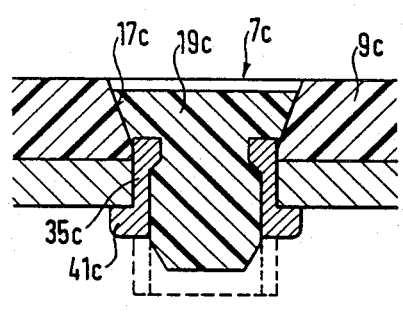

FIG. 6 shows a connection element 7c which differs from the connection element 7b solely in the nature of the closure head 41c of the hollow rivet 35c anchored in the tapered synthetic plastics material head 19c. The closure head 41c is not crimped on the hollow rivet 35c, but upset thereon, whereby the head 19c is drawn more firmly into the tapered opening 17c of the friction lining 9c. Otherwise, the connection element 7c corresponds to the connection element 7b.

Figure 7:
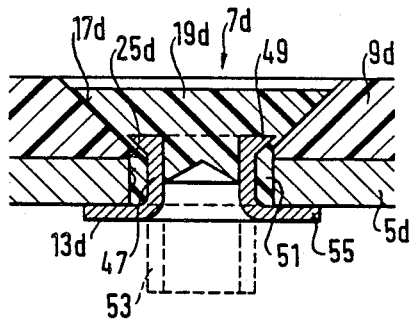

FIG. 7 shows a connection element 7d having a tapered synthetic plastics material head 19d which is seated in a tapered opening 17d of the friction lining 9d. The opening 17d again merges in its region of smallest diameter into a cylindrical opening 25d, for the compensation of diameter tolerances. In the synthetic plastics head 19d, a hollow rivet consisting of metal, for example sheet metal, is anchored by means of an annular collar 49 which protrudes radially outwards in the region of the smallest diameter of the tapered synthetic plastics material head 19d. The synthetic plastics material head 19d is injection-molded to the hollow rivet 47 and jackets the hollow rivet with a sleeve section 51, which extends over the thickness of the lining carrier 5d. The jacketing 51 increases the shearing strength of the connection element 7d. The external diameter of the annular collar 49 is made, to increase the tensile strength of the connection, somewhat larger than the diameter of the opening section 25d or of the hole 13d in the lining carrier 5d. The hollow rivet 47 originally has the form illustrated in chain lines at 53, and is crimped over to form a closure head 55, by means of a tool in assembly. In this variant of the connection element 7d, again the synthetic plastics material head 19d ensures an increase of the wearing volume of the friction lining 9d.

Figure 8:
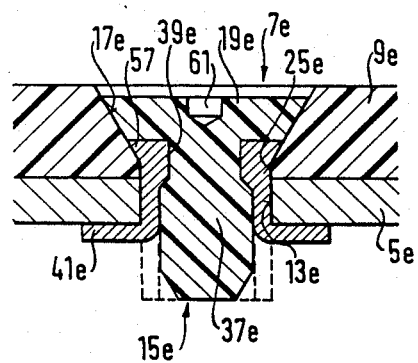

FIG. 8 shows a connection element 7e having a tapered synthetic plastics material head 19e which is seated in a tapered opening 17e of the friction lining 9e. For the compensation of diameter tolerances, the opening 17e merges in its region of smallest diameter into a cylindrical opening 25e. Similar to the connection element in FIG. 5, the shank 15e penetrating the hole 13e of the lining carrier 5e comprises a metallic hollow rivet 35e, which is filled out by a synthetic plastics material core 37e integrally connected with the synthetic plastics material head 19e. The hollow rivet 35e ends in the region of the smallest diameter of the synthetic plastics material head 19e and is here provided with a radially inwardly projecting, for example upset, annular collar 39e, for anchorage in the synthetic plastics material head. In distinction from the connection element in FIG. 5, a radially outwardly protruding annular collar 57 is formed, for example by upsetting, additionally on the hollow rivet 35e, radially opposite to the annular collar 39e. The annular collar 57 has a tapered surface 59 forming its external circumference, which forms a part of the tapered peripheral surface of the head 19e and, in the installed condition, rests on the matchingly formed tapered opening 17e of the friction lining. This has the advantage that tension forces can be taken up directly by the hollow rivet 35e. Furthermore, the centering of the connection element 7e is improved, since irregularities at the transition of the tapered surface of the synthetic plastics material head 19e into the cylindrical surface of the shank 15e are avoided. The closure head 41e can be attached, as illustrated, by crimping or equally upsetting. A centering opening 61 in the end face of the synthetic plastics material head 19e permits precise fixing of the connection element 7e in riveting.

Figure 9:
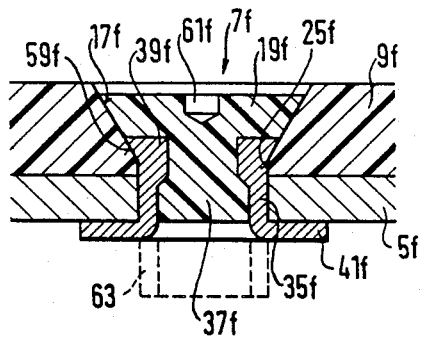

FIG. 9 shows a connection element 7f which differs from the connection element according to FIG. 8 essentially only in that the core 37f formed on the synthetic plastics material head 19f is shortened and extends, before the deformation of the hollow rivet 35f, only over a part of the original length, indicated at 63, of the hollow rivet 35f. In this form, the introduction of a riveting tool into the hollow rivet 35f for the forming-on of the closure head 41f is facilitated. The centering of the connection element 7f for the riveting operation is again facilitated by a centering opening 61f.

While specific embodiments of the invention have been shown and described in detail to illustrate the application of the inventive principles, it will be understood that the invention may be embodied otherwise without departing from such principles.

What we claim is:

1. A clutch disc for a friction disc clutch comprising
(a) a hub,
(b) a lining carrier of disc form held on the hub,
(c) friction linings on both sides of the lining carrier, and
(d) connection elements consisting at least partly of synthetic plastics material which anchor the friction linings in holes of the lining carrier, each connection element comprising
a shank passing through the hole, anchoring members carried on the shank on the side of the lining carrier remote from the friction lining and engaging behind the edge of the hole, wherein each connection element carries, for securing on the friction lining, a synthetic plastics material head widening conically away from the lining carrier, which head is seated in a matching tapered opening of the friction lining, the shank comprises a hollow rivet consisting of metal and anchored in the synthetic plastics material head, which rivet is expanded, especially upset or crimped over, on the side of the lining carrier remote from the friction lining for the formation of the anchoring members.

2. A clutch disc according to claim 1, wherein the hollow rivet encloses a synthetic plastics material core formed integrally on the synthetic plastics material head.

3. A clutch disc according to claim 2, wherein the synthetic plastics material core comprises at its end remote from the synthetic plastics material head a tool introduction taper tapering towards the end, which at least partially overlaps with the hollow rivet in the longitudinal direction of the shank.

4. A clutch disc according to claim 1, wherein the hollow rivet forms the outer jacket of the shank and comprises, in the region of the smallest diameter of the synthetic plastics material head, a radially inwardly protruding annular collar anchored in the synthetic plastics material head.

5. A clutch disc according to claim 4, wherein the hollow rivet comprises, in the region of the smallest diameter of the synthetic plastics material head, a radially outwardly protruding annular collar, the external circumferential surface of which has taper form and is seated in the matching tapered opening of the friction lining.

6. A clutch disc according to claim 1 wherein the hollow rivet is jacketed with synthetic plastics material at least on its outside in the region overlapping with the lining carrier in the longitudinal direction of the shank and comprises, in the region of the smallest diameter of the synthetic plastics material head, a radially outwardly protruding annular collar anchored in the synthetic plastics material head.

7. A clutch disc according to claim 6, wherein the external diameter of the annular collar is larger than the external diameter of the shank.

8. A clutch disc for a friction disc clutch comprising
(a) a hub,
(b) a lining carrier of disc form held on the hub,
(c) friction linings on both sides of the lining carrier, and
(d) connection elements consisting at least partly of synthetic plastics material which anchor the friction linings in holes of the lining carrier, each connection element comprising
a shank passing through the hole, anchoring members carrier on the shank on the side of the lining carrier remote from the friction lining and engaging behind the edge of the hole, wherein each connection element carries, for securing on the friction lining, a synthetic plastics material head widening conically away from the lining carrier, which head is seated in a matching tapered opening of the friction lining, the tapered opening of the friction lining merges on the side of the lining carrier into a cylindrical opening zone, the diameter of which is equal to the diameter of the hole of the lining carrier.

* * * * *